Oct. 14, 1969  J. W. SANDERSON  3,472,279
SINGLE HANDLE BALL VALVE FAUCET
Filed Sept. 19, 1966
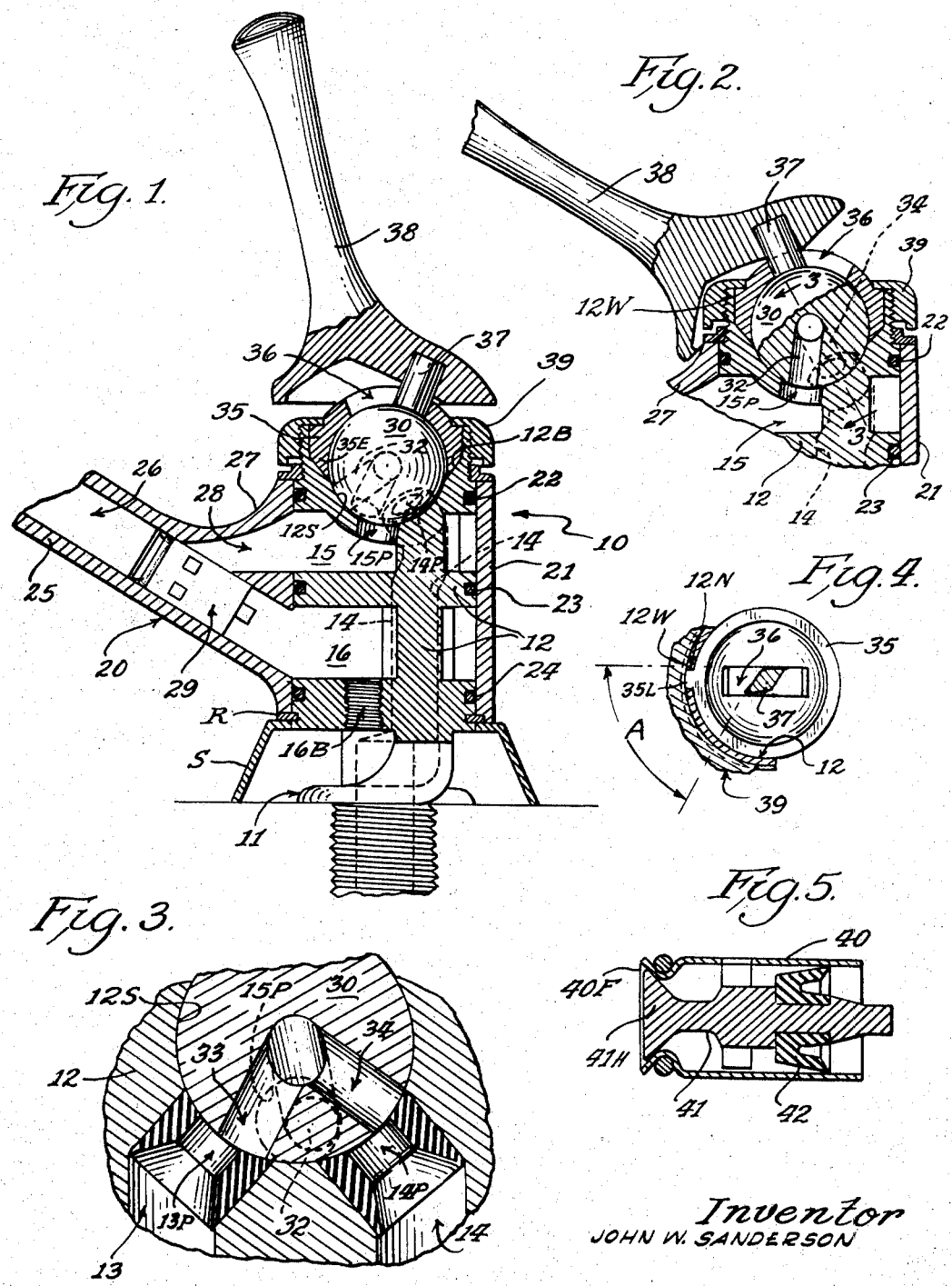
Inventor
JOHN W. SANDERSON
By Dressler, Goldsmith,
Clement and Gordon
Attys.

United States Patent Office 3,472,279
Patented Oct. 14, 1969

3,472,279
SINGLE HANDLE BALL VALVE FAUCET
John W. Sanderson, Delphi, Ind., assignor to Globe Valve Corporation, a corporation of Indiana
Filed Sept. 19, 1966, Ser. No. 580,231
Int. Cl. F16k *19/00*
U.S. Cl. 137—625.41                    9 Claims

ABSTRACT OF THE DISCLOSURE

A valve faucet for proportioning and varying the volumetric flow of streams of hot and cold water, said faucet having a ball and retainer race subassembly insertable in and removable from a valve body, the valve body having a parti-spherical valve seat, the retainer race captively encircling the ball above and below an equatorial plane to accommodate and guide ball rotation therein, annular sealing means for sealingly lifting the ball into the retainer race and away from the valve seat and retaining means for positioning and holding the retainer race in a predetermined location within the valve body.

---

This invention relates to a ball valve faucet and, more particularly, is concerned with single handle mixing faucets of the ball valve type for use in kitchens or in lavatory sinks or tubs.

While single handle mixing faucets have long been known, it is only in recent years that these devices have been marketed in volume. There are currently on the market a number of different types of single handle faucets including some of the ball type. It is believed that there is need for improvement from the standpoint of facilitating maintenance and repair of the faucet. At present, the designs in use have a number of loose parts which make it difficult for the average home repairman to disassemble and correctly reassemble the unit. Certain of the parts in the faucets, such as the seal rings, are continuously subject to wear and require periodic inspection and replacement. While such operations are not difficult, lack of familiarity on the part of the homemaker makes maintenance and repair a difficult practical problem frequently requiring a plumber's services.

In accordance with the invention, a ball type faucet is provided wherein the ball, a retainer, a ball stem and a control handle are handled as part of a convenient subassembly which remains intact during removal to be ready for immediate reassembly in predetermined registry to the main support structure. The main support structure includes a valve body having a ball seat provided with conventional inlet and outlet ports equipped with seals that may require replacement from time to time. The seat region is readily accessible simply by removal of the ball subassembly.

Another feature of the faucet valve of this invention resides in the provision of a retainer race captively encircling the ball to support the ball in proper position upon the valve seat. The retainer race, in serving to regulate the seating relationship of the ball upon the seat, enables control of the sealing forces acting between the ball and the seal elements located in the seat. In addition, the retainer race provides a main seal preventing leakage from the faucet fixture while accommodating substantially free ball rotation. In the embodiment disclosed, herein, the retainer race has a guide slot determining the travel path of the stem and uniquely regulating ball rotation. The race encircles the ball in an overcenter relationship to receive the ball in snap fit engagement, with an annular edge region of the race being inwardly deflectable to establish a continuous main seal when the race is seated in fixed position in the valve body.

A single handle mixing type faucet valve is provided wherein a spout assembly is associated with the valve body and is equipped with a diverter to direct flow either to the normally open outlet at the tip of the spout or to a valved outlet such as is used with a spray house or dishwasher attachment.

Other features and advantages of the invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of the specification, and in which like numerals are employed to designate like parts throughout the same, FIG. 1 is a vertical section through a single handle ball type mixing faucet constructed in accordance with this invention, the ball being shown in its "off" position;

FIG. 2 is a related fragmentary vertical section through the ball and valve seat region and illustrating the ball in its "on" position;

FIG. 3 is an enlarged fragmentary section taken as indicated on the line 3—3 of FIG. 2;

FIG. 4 is a plan view of the retainer race; and

FIG. 5 is a lengthwise section through the diverter unit that is mounted within the spout.

Referring now to the drawings, the illustrated single handle mixing faucet, as designated generally at 10, is of a type such as would be used on a kitchen sink fixture and it includes a fitting 11 of any suitable type to be mounted adjacent the sink rim and to be connected to the usual hot and cold water inlet lines (not shown) and to the spray hose or dishwasher attachment (not shown). The lower part of the fitting is masked by a shield S which is fixed in place by a lock ring R. The fitting 11 carries a generally cylindrical upstanding valve body 12 of cast brass or similar material which is provided with a cold water inlet passage 13 and a hot water inlet passage 14 extending generally vertically therein.

The valve body 12 has a recessed region within its upper end defining an outwardly diverging parti-spherical concave seat 12S, with the inlet passages terminating in inlet port regions 13P, 14P communicating with spaced regions of the valve seat. The valve body has vertically spaced annular recesses defining a discharge chamber 15 and an auxiliary chamber 16. The discharge chamber 15 communicates with the valve seat through a discharge port 15P and the auxiliary chamber 16 communicates with a bottom outlet 16B that leads to the spray hose attachment. A composite spout assembly, as indicated generally at 20, includes a bearing sleeve portion 21 which encircles the valve body 12 to rotate thereabout, with a set of three O-ring seals 22, 23 and 24 being provided to prevent end leakage and to isolate the discharge and auxiliary chambers. The spout includes a stem portion 25 that defines a main bore 26 having the usual spout tip end serving as an open outlet and having its inner end communicating with the auxiliary passage 16. The flared region 27 of merger of the spout stem 25 with the sleeve 21 defines a feeder passage 28 which communicates with the discharge chamber 15 and intersects the main bore 26. A diverter unit 29 of any conventional form is shown in the main bore 26 at the region of intersection with the feeder passage 28 and it functions to allow discharge through the spout tip when the separately valved spray hose is closed and to allow discharge only through the bottom outlet 16B when the spray hose is open.

A ball valve 30 which may be of any suitable type and material is shown riding in the valve seat. The ball valve has a Y-passage defined by a common outlet bore 32 and a pair of intake bores 33, 34. The inlet and outlet bores are arranged to register with the corresponding inlet and outlet ports of the valve seat to control both total volume flow through and the mixing ratio of the flow. The ball valve 30 is shown in its full "on" position in FIG. 2 whereas it is shown in its full "off" position in FIG. 1. The registration of the inlet bores 33, 34 with the inlet ports 13P, 14P is illustrated in FIG. 3 for the equal volume mixing condition. It will be apparent that the ball may be rotated from this position to achieve all hot or all cold intake flow, these valving relationships being conventional and well known practice in ball valve type mixing faucets.

In accordance with the invention, the ball valve 30 is carried in a retainer race 35 of hollow parti-spherical form which captively encircles the ball in an overcenter relationship about a central region thereof and presents a parti-spherical ball contact surface that guides and accommodates the desired ball rotation. The retainer race 35, which is of a lubric plastic material, preferably Teflon though nylon is also contemplated, has a domed upper end provided with a generally rectangular guide slot 36 and a connector stem 37 of diamond shaped transverse section extends from the ball 30 and projects through the guide slot to receive the control handle 38.

The valve body 12 has an annular bevel face 12B immediately adjoining and flaring upwardly and outwardly from the valve seat 12S, with the valve body having an annular upper end wall 12W offset outwardly from the ball to define an annular mounting space which receives the retainer race 35. A retainer cap 39 is threaded onto the upper end of the valve body and serves to lock the retainer race 35 and ball valve 30 in the valve seat 12S while enabling easy removal of the retainer race and ball valve as a subassembly. The upper end wall 12W of the valve body has an edge notch 12N adjoining the mounting space for the retainer race and the race 35 has an edge lug 35L (see FIG. 4) to seat in this notch and register and locate the race in a predetermined position so that upon removal and reassembly, the parts are automatically positioned correctly.

In the disclosed embodiment, the connector stem 37, which is diamond shape in transverse section, passes through the guide slot 36 of the race in clearance or close clearance relation to restrict rotation of the stem about its own axis to an angular range of about 60° as determined by the angle A pictured on FIG. 4. Rotation of the stem about its lengthwise axis is selected to control the mixing ratio. The extremes of stem movement along the lengthwise direction of the slot are pictured in FIGS. 1 and 2 so that the cooperation of the race slot configuration and the stem determines the "on" and "off" positional relationships of the ball valve. Thus the ball passage means are selectively registrable with the inlet port means and the outlet port means to regulate total volume and mixing flow in accordance with predetermined ball rotation about first and second perpendicular axes, the race having an elongated guide slot, and said stem having a non-circular transverse sectional profile shiftable bodily along the length of the guide axis to regulate ball rotation about one of said axes and the stem being rotatable between opposite lateral extremities of said slot to regulate ball rotation about the other of said axes.

As is apparent from the drawings, the retainer race 35 encircles the ball at regions above and below the center or equator line so that the race is initially snapped on to the ball and thereafter captively holds the ball for substantially free guided rotation. The lower annular edge of the retainer race 35E has a beveled region mating with the beveled intermediate face 12B provided adjacent the valve seat so that when the retaining cap 39 seats the race within the valve body during final tightening of the cap, the free edge 35E of the retainer race is deflected or loaded into annular sealing engagement with the ball at a location below the center or equatorial plane of the ball.

An upward force component, therefore, holds the ball snugly in the race and avoids jamming the ball deeply into the valve seat, thereby minimizing the friction acting between the ball and the valve seat.

Each of the inlet ports 13P, 14P has a rubber-like seal sleeve 13S, 14S disposed within it. Each seal sleeve is slightly longer than the inlet section leading to the corresponding port so that each sleeve is normally self biased into contact with the ball surface for sealing against leakage at this region. The controlled seating of the ball 30 as determined by the overcenter engagement of the retainer race regulates the pressure acting between the inlet seal sleeves and the ball and promotes longer seal life. The main seal for preventing external leak age from the fixture is accomplished by the deflected race edge 35E which establishes continuous annular contact with the ball.

The suspended or floating mounting which is achieved for the ball eliminates wearing of the valve seat and confines the friction and wear primarily to the retainer race and the ball itself. These parts are easily removed as a subassembly simply by backing off the retainer cap 39 and lifting the ball and retainer race out of the valve body. This enables inspection and replacement of the sealing sleeves if this is required and the ball and retainer race may be replaced by a new subassembly if necessary. The replacement operation is free of error as the locating or positioning lug 35L on the retainer race engages the locating notch 12N in the valve body to determine the only correct position for the ball and race.

For completeness of disclosure, the diverter unit 29, which may be of any conventional form, is here shown as including an apertured shell 40 mounting an axially shiftable valve stem 41 having at one end a valve head 41H seating in sealing relation, with an annular seal face 40F provided by the cage to regulate the flow towards the open outlet provided by the spout. The other end of the valve stem carries a deformable rubber-like element 42 which presents greater surface area than does the valve head to liquid entering the diverter shell through its side wall openings. Therefore, when the spray hose or dishwasher outlet is valved to "on," the differential area relationships hold the valve stem with the valve head seated and the incoming water deforms and passes around the rubber-like element. When the valved outlet is closed, the water pressures balance out across the deformable element 42 and the remaining force acting on the valve head 41H unseats the same and allows water flow through the open outlet at the spout tip.

In the present disclosure, the handle 38 is styled for use as a kitchen fixture. Alternate handle styles, such as circular knobs, are contemplated for bathroom fixtures.

What is claimed is:

1. In a faucet valve, a valve body having an outwardly diverging, parti-spherical concave seat, inlet port means and outlet port means communicating with spaced regions of said seat, a ball disposed in said seat and having passages means for connecting said port means in flow through relationship, a retainer race member captively encircling said ball above and below an equatorial plane of said ball and presenting an annular parti-spherical ball contact surface to accommodate and guide ball rotation therewithin and relative thereto, stem means connected to said ball and projecting in clearance relation through said retainer race member, means for sealing said ball to said seat below said equatorial plane, and retaining means for mounting said retainer race member in predetermined stationary position in said valve body with said ball contact surface adjoining said seat and annular sealing means urged against the surface of said ball below said equatorial plane for sealing the surface of said ball above said equatorial plane from said inlet port means and outlet port means.

2. In a faucet valve in accordance with claim 1 and wherein said annular sealing means is an annular portion of said race member, and said valve body has a bevel face adjoining and recessed from the spherical plane of said valve seat for urging said annular portion into sealing engagement with said ball surface and for lifting said ball into said race member and away from said seat.

3. In a faucet valve in accordance with claim 1 and wherein said retaining means comprises an edge notch in said valve body bordering the mounting location for said race member and a lug on said race member engageable in said notch to establish said predetermined position of said race with respect to said valve body.

4. In a faucet valve in accordance with claim 1 and wherein said retaining means comprises a removable annular cap engaging said valve body to load said annular sealing means against said ball, said cap having a central opening to receive said stem in clearance relation.

5. In a faucet valve in accordance with claim 1 and wherein said valve body has a pair of inlet passages each terminating in a separate inlet port communicating with said seat, said ball has passage means selectively registrable with said inlet ports and with said outlet port means to regulate total volume and mixing ratio in accordance with predetermined ball rotation about first and second perpendicular axes and wherein said race defines a narrow elongated guide slot through which said stem projects, said stem being substantially longer than any cross-sectional dimension of said stem, and said stem has a diamond-shaped transverse sectional profile, said stem means and said guide slot being proportioned so that as said stem means is moved along the length of said slot, said ball moves within said race about one of said axes and as said stem means is rotated about its longitudinal axis between opposed lateral extremities of said slot, said ball moves within said race about the other of said axes.

6. In a faucet in accordance with claim 5 and wherein said annular sealing means is an annular portion of said race member and said valve body has a bevel face adjoining and recessed from the spherical plane of said valve seat for urging said annular portion into sealing engagement with said ball surface and for lifting said ball in said race member and away from said seat.

7. In a faucet valve in accordance with claim 1 and wherein said annular sealing means is an annular portion of said race member and said valve body has an annular surface disposed immediately above and merging with said concave seat to load said annular portion against said ball surface and to lift said ball into said race member and away from said seat.

8. In a faucet valve having a valve body having an outwardly diverging, parti-spherical concave seat, inlet port means and outlet port means communicating with spaced regions of said seat and means for sealing a ball to said seat, a removable subassembly comprising a ball removably disposed in said seat and having passage means for connecting said inlet and outlet port means in flow through relationship, a unitary plastic retainer race captively encircling said ball above and below an equatorial plane of said ball and presenting an annular parti-spherical ball contact surface to accommodate and guide ball rotation therein and relative thereto, a stem means connected to said ball and projecting in clearance relation through said race, and a control handle connected to said stem means, and means on said subassembly for locating and holding said retainer race in predetermined stationary position in said valve body, said valve body further comprising complementary locating means cooperably engaging said subassembly locating means.

9. In the faucet valve of claim 8 wherein said retainer race defines a longitudinal slot through which said stem means passes, said stem means defining a non-circular transverse cross-section having dimensions shorter than the length of the slot, said slot being proportioned to cooperate with said stem means to limit rotation thereof about the axis of said stem means and thereby to limit said ball within said retainer race to oscillation about the axis of said stem means and to movement of the ball about an axis transverse to the longitudinal dimension of said slot.

References Cited

UNITED STATES PATENTS

| | | | |
|---|---|---|---|
| 1,614,437 | 1/1927 | Cochran | 137—625.41 |
| 2,592,062 | 4/1952 | Perry | 137—625.41 |
| 3,056,418 | 10/1962 | Adams et al. | 137—119 |
| 3,130,750 | 4/1964 | Post | 137—636.3 |
| 2,838,070 | 6/1958 | Williams | 137—607 XR |
| 3,107,546 | 10/1963 | Rowland | 251—288 XR |
| 3,265,082 | 8/1966 | Perlman | 137—119 |
| 2,911,009 | 11/1959 | Parker | 251—317 XR |
| 3,167,086 | 1/1965 | Michalski | 251—317 XR |

HENRY T. KLINKSIEK, Primary Examiner

U.S. Cl. X.R.

137—119, 636.3; 251—172